United States Patent [19]
Fischer

[11] 3,911,199
[45] Oct. 7, 1975

[54] SEISMIC MOTION-DAMPER FOR UPSTANDING ELECTRICAL EQUIPMENT

[75] Inventor: Edward G. Fischer, Verona, Pa.

[73] Assignee: Westinghouse Electric Corporation, Pittsburgh, Pa.

[22] Filed: Apr. 26, 1974

[21] Appl. No.: 464,729

[52] U.S. Cl..................... 174/42; 188/1 B; 200/301
[51] Int. Cl.².... F16F 7/10; F16F 9/00; H02B 5/00
[58] Field of Search ........... 174/42; 52/1, 167, 173; 188/1 B, 266; 200/48 R, 301; 248/358 R; 343/DIG. 1

[56] References Cited
UNITED STATES PATENTS

| | | | |
|---|---|---|---|
| 2,714,161 | 7/1955 | Featherstun | 188/1 B |
| 2,837,175 | 6/1958 | Schweitzer | 188/1 B |
| 2,838,137 | 6/1958 | Wallerstein, Jr. | 188/1 B |
| 3,174,589 | 3/1965 | Chen | 188/1 B X |
| 3,188,644 | 6/1965 | Sielaff | 188/1 B |
| 3,210,765 | 10/1965 | Jones | 174/42 X |
| 3,266,600 | 8/1966 | Brunner | 188/1 B |
| 3,310,138 | 3/1967 | Reed | 174/42 UX |
| 3,612,222 | 10/1971 | Minor | 188/1 B |
| 3,780,207 | 12/1973 | Crosby et al. | 174/42 |
| 3,826,340 | 7/1974 | Brokaw | 174/42 X |

FOREIGN PATENTS OR APPLICATIONS

| | | | |
|---|---|---|---|
| 498,559 | 12/1953 | Canada | 174/42 |
| 728,734 | 2/1966 | Canada | 174/42 |
| 1,298,164 | 6/1969 | Germany | 343/DIG. 1 |

Primary Examiner—Laramie E. Askin
Attorney, Agent, or Firm—W. R. Crout

[57] ABSTRACT

A seismic motion-damper comprising an inertia element disposed within a container containing a fluid-liquid is attached to an upper portion of upstanding electrical equipment, and said damper is tuned so as, by utilizing sympathetic vibrations, tends to cancel out seismic vibrations, which otherwise could damage the electrical equipment.

The damping device includes an inertia element disposed within a surrounding container, the latter containing a liquid which serves to damp vibrating motion of the container by the liquid movement within the container caused by relative motion between the inertia element and the surrounding container. If desired, one or more damping cylinders may be additionally provided within the container to assist in damping the seismic vibrations.

1 Claim, 7 Drawing Figures

SEISMIC MOTION-DAMPER FOR UPSTANDING ELECTRICAL EQUIPMENT

CROSS-REFERENCES TO RELATED APPLICATIONS

Reference may be made to U.S. Patent Application filed Dec. 30, 1974 Ser. No. 537,515 by Charles B. Wolf and Donald G. Blazer and assigned to the assignee of the instant application, the structure in the aforesaid patent application illustrating dashpot devices secured to a lower portion of the framework of upstanding electrical equipment.

BACKGROUND OF THE INVENTION

Field of the Invention

The present invention is particularly applicable to upstanding electrical equipment which is disposed in areas of the country where seismic vibrations may occur, for instance in California where relatively recently, that is Feb. 9, 1971, severe damage was caused by the San Fernando earthquake in California upon building structures and other upstanding equipment including circuit-breakers. As well known by those skilled in the art, at the higher voltages, say 55 kv, 750 kv and 1000 kv, the installation requirements demand that the upstanding insulating supports be disposed at considerable distances physically above ground level. Since these supports are insulating, in many instances they are formed of porcelain, or other insulating material which is subject to fracture upon excessive vibration. Moreover, in the case of "live-tank" breakers, the actual heavy interrupting unit is disposed at a considerably elevated distance above ground potential, and, again, is subject to seismic vibrations. Accordingly, the present invention is applicable to upstanding electrical equipment disposed in areas wherein seismic vibrations are encountered.

SUMMARY OF THE INVENTION

According to the present invention, a tuned seismic vibration damper is provided, including a container containing a liquid-fluid, which is relatively insensitive to temperature variations, and an inertia element is provided interiorly within said surrounding container, so that the inertia element remains relatively fixed, whereas the surrounding container, with the liquid-fluid, moves with the upstanding structure, and the damper is tuned so as to cancel out seismic vibrations encountered by virtue of the phenomenon called "sympathetic vibration."

One or more damper cylinders may be disposed interiorly within the surrounding container, and may assist in the damping motion by causing motion of the liquid-fluid within the container. If desired, the inertia element may be, additionally, mounted upon rollers, steel balls, or other friction-reducing devices.

Further objects and advantages will readily become apparent upon reading the following specification taken in conjunction with the drawings, in which.

DESCRIPTION OF THE PREFERRED EMBODIMENTS

Figure 1:
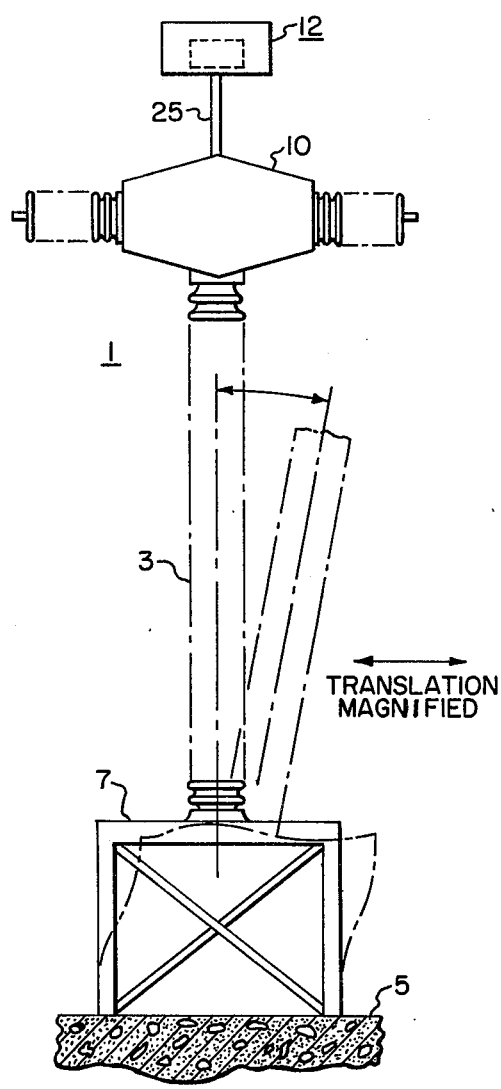
FIG. 1 illustrates, somewhat diagrammatically, an upstanding high-voltage compressed-gas circuit-interrupter embodying the principles of the present invention.

The San Fernando earthquake of Feb. 9, 1971, showed that live-tank extra-high-voltage circuit-breakers 1 are susceptible to damage in an adverse seismic environment. In particular, the low natural frequency (approximately 2.2 Hz) and low damping (approximately 1% of critical) of the porcelain column interrupter system 3 means that quasi-resonance swaying motion buildup can occur. Assuming that the concrete foundation 5 and underlying soil preparation are adequate, FIG. 1 shows how both the translation and rotation of the bottom-plate support 7 for the upstanding porcelain column 5 can contribute to the large amplitude motion at the interrupter 10. This is estimated at ±4 inches for a 0.5g earthquake.

The porcelain column 3 design can be made stronger by increasing its diameter and applying larger compressive loads by means of axial tie-rods. This solution is considered practical, but requires new designs and expensive back-fitting. The concentrated bending load at the base of the porcelain column 3 can be reduced by adding sway-braces, that is porcelain guys in tension between the interrupter column-attachment and the support platform. This solution is not considered practical because platform outriggers would be required and the guys would have to be cleaned to minimize corona discharge caused by salt spray, etc.

Figure 2:
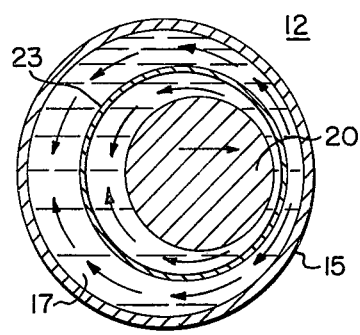
FIG. 2 is an enlarged cross-sectional view taken through the tuned seismic vibration-damper of FIG. 1, illustrating the movement of the liquid-fluid therein, and also diagrammatically indicating the relative motion between the several members.

According to the present invention, there is provided a seismic motion-damper, generally designated by the reference number 12, and illustrated more clearly in FIG. 2 of the drawings. As shown particularly in FIG. 2, it will be observed that there is provided an outer container 15, which contains a liquid-fluid 17 which, preferably, is relatively insensitive to wide-temperature variations. I prefer to utilize liquids 17 known under the trade name "Silicone," which are polymethyl siloxanes, and are supplied by a number of companies, for example: Dow Corning Corporation at Midland, Michigan 48640 and the General Electric Company at its division located at Pittsfield, Massachusetts.

Figure 4:
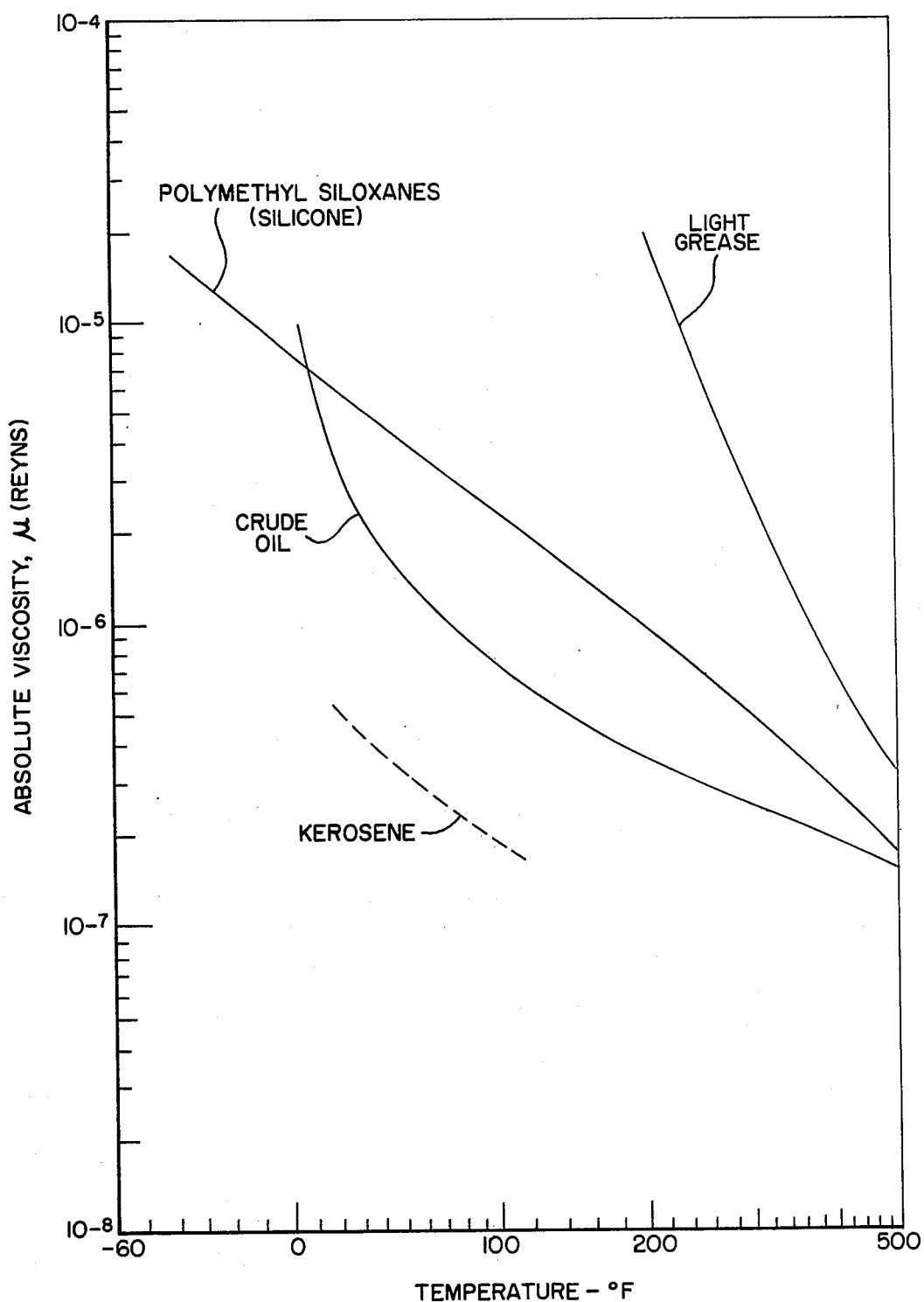

As shown in the attached graph of FIG. 4, such polymethyl siloxanes (silicone) 17 are relatively insensitive to wide temperature variations, this graph showing the viscosity-temperature curve for the fluid 17. It will be noted that the ordinates are on a logarithmic scale so that they actually indicate tremendous changes in viscosity, and the abscissa illustrates the temperature in degrees Fahrenheit.

Disposed within the container 15 is the inertia element, designated by the reference numeral 20, and freely movable within the container 15, that is within the liquid fluid 17. If desired, one or more damper cylinders 23 may be utilized to additionally assist in the damping motion by, as shown, causing motion of the liquid-fluid 17. The seismic damper 12 of the present invention, as tuned, either eliminates or minimizes the damaging effects of the seismic disturbances. As shown in FIG. 1, it generally embodies a vertical cantilever attachment 25 to the top of the interrupter 10 of a leak-proof cylindrical container 15 enclosing an inertia element 20 submerged in a silicone damper fluid 17. The length of the cantilever rod-spring 25 can be adjusted so that this so-called "tuned vibration absorber" oscillates at the natural frequency of the porcelain column 3, thereby reducing the amplitude of the seismic induced swaying motion at the interrupter 10.

FIG. 2 shows more clearly how the "inertia lag" of the cylindrical mass 20 causes damper fluid 17 to be pumped tangentially between concentric cylinders 15, 23 and 20, thereby absorbing energy. Additional damper cylinders 23 can be added to optimize the performance of this device, as determined by vibration tests.

Figure 2B:
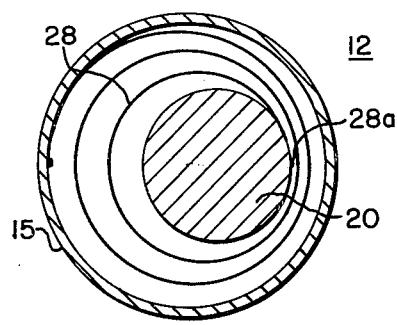
FIGS. 2A–2C illustrate modifications of the construction of the vibration-damper device of the present invention.
Figure 2A:
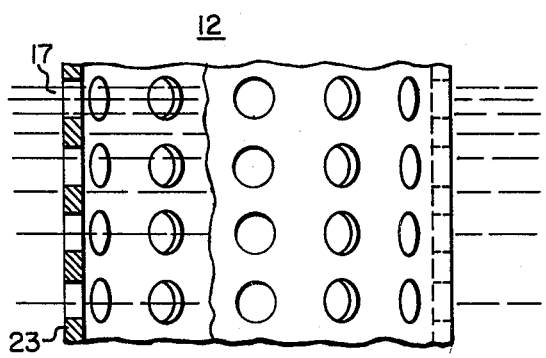

In place of using many concentric damper sleeves 23, the inertia effect can be incorporated in just a few sleeves 23, which are then filled with radial holes to provide energy absorption by pumping the liquid-fluid in a radial direction through the holes, as illustrated more clearly in FIG. 2A. Also, it may be, in some instances, desirable to replace the concentric damper sleeves with a spiral-wound flat sheet of metal 28, with one end 28a fixed to the center mass 20 and the other end to the outer container 15, as illustrated in FIG. 2B. To reduce friction on the bottom 30 of the container 15, the weight of the center inertia mass 20 could be supported on a layer of closely-packed spherical balls, as shown in FIG. 2C.

It is proposed that the tuning operation of the seismic damper would be provided largely by tests, but, generally speaking, the cantilever rod 25, which could be of cold-rolled steel, for example, would be approximately 1 inch long, and the vibration damper 12 would roughly be 25 pounds in weight. The inertia element 20 would be, for example, cold-rolled steel, for example, weighing, say, 10 or 15 pounds.

Figure 3:
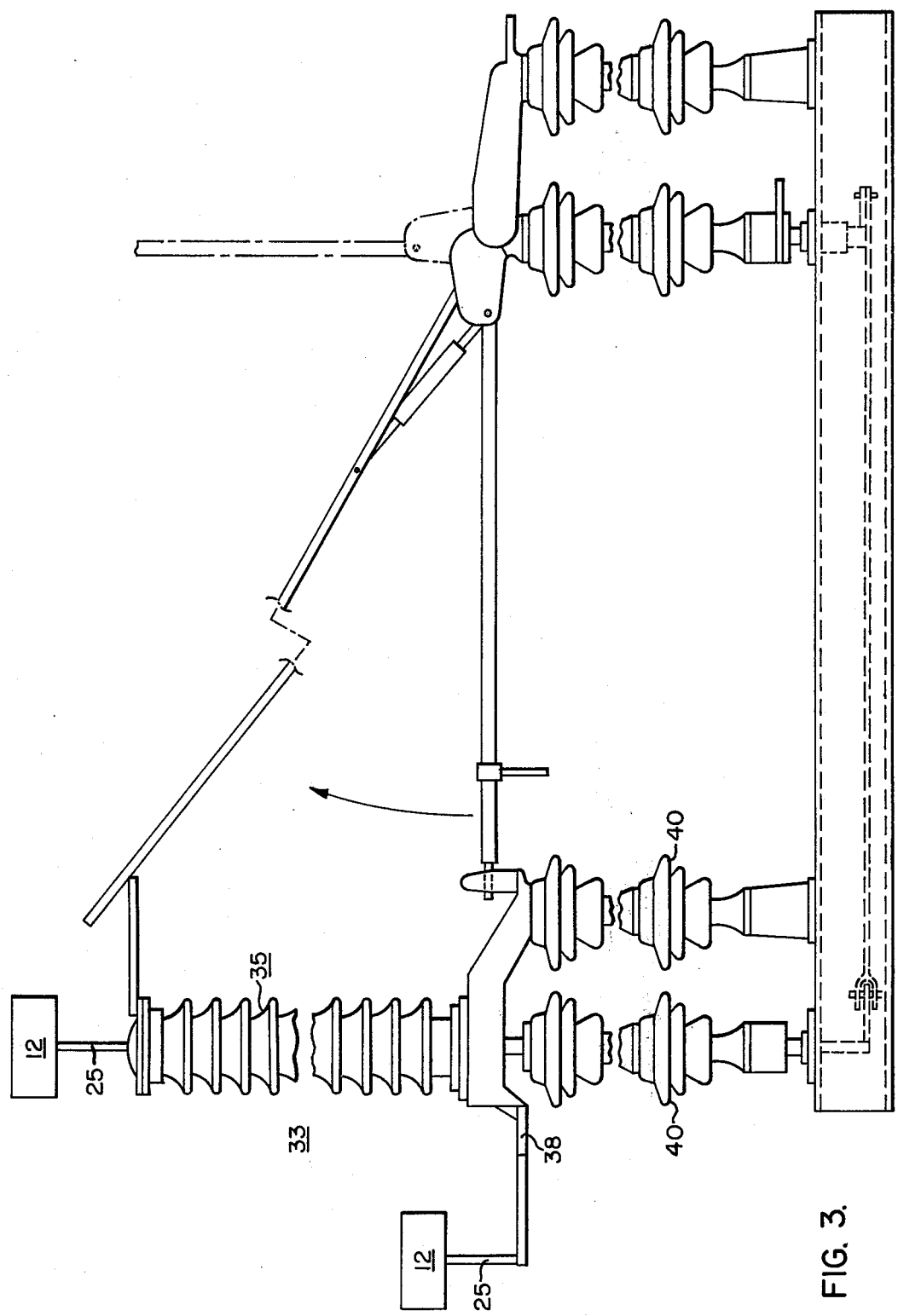
FIG. 3 illustrates another application of the invention to a high-voltage load-break disconnecting switch in which two such seismic vibration-dampers are provided; and, FIG. 4 is a graph of absolute viscosity vs. temperature for polymethyl siloxanes — (silicones).

FIG. 3 illustrates an application of the present invention to a very high voltage load-break disconnecting switch 33, say of 1,000 kv rating. This figure illustrates the application of two such vibration dampers 12, one being disposed vertically at the top of the interrupter column 35, similar to the arrangement illustrated in FIG. 1, and the other seismic vibration damper 12 being disposed adjacent the end terminal 38 of the device. It will be noted in regard to the lower seismic damper device 12 that although it is disposed at a lower elevation than the upper seismic damper device, nevertheless by virtue of the vertical height of the post-type insulators 40, and the extremely high-voltage rating of the equipment, that vibration of the upstanding post-insulators 40 may create a problem in vibration, and the lower-disposed seismic vibration damper 12 assists in cancelling out these dangerous seismic vibrations.

Figure 2C:
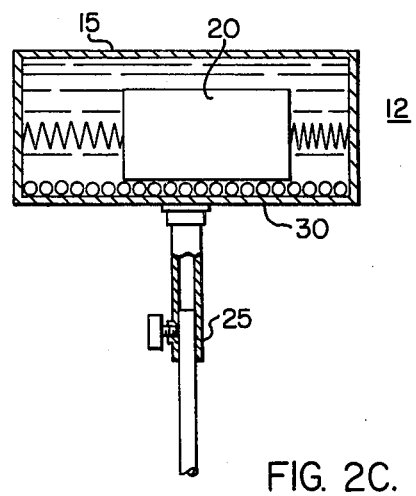

Although the tuning would preferably be conducted within a test laboratory, nevertheless, the steel rod 25 could be arranged in a telescopic arrangement, as illustrated in the enlarged FIG. 2C, so that it could be elongated or shortened, as desired, for tuning purposes. The theory of tuning such devices is set forth, in detail, in three volumes entitled "Shock and Vibration Handbook" published by the McGraw Hill Book Company Inc., and copyrighted in 1961, Edited by Cyril M. Harris and Charles E. Crede. The principles of tuning are well known by those skilled in the art.

Reduction of vibration is achieved because the inertia mass 20 vibrates out of phase with the vibration to be eliminated; sometimes this is called sympathetic vibration. The theory of the tuned damper and a number of applications are discussed in chapter 6 of the aforesaid "Shock and Vibration Handbook."

Although there has been illustrated and described several embodiments of the invention, it is to be clearly understood that the same were merely for the purpose of illustration, and that changes and modifications may readily be made therein by those skilled in the art, without departing from the spirit and scope of the invention.

I claim:

1. In combination, upstanding electrical equipment and a tuned damping device affixed adjacent a high point of said upstanding electrical equipment, whereby sympathetic vibrations will tend to cancel out damaging vibrations, said damping device comprising a container having a liquid-fluid disposed therein, an inertia element disposed within said container, and a helically-configured damping element provided interiorly within said container having one end thereof affixed to the internally-disposed inertia element and its other end affixed to the outer container.

* * * * *